(12) United States Patent
Van Lant et al.

(10) Patent No.: US 10,066,588 B2
(45) Date of Patent: Sep. 4, 2018

(54) MULTI-CHAMBER BLOWOFF VALVE

(71) Applicant: Accessible Technologies, Inc., Lenexa, KS (US)

(72) Inventors: Tyler Van Lant, Olathe, KS (US); Michael A. Carlson, Overland Park, KS (US)

(73) Assignee: Accessible Technologies, Inc., Lenexa, KS (US)

( * ) Notice: Subject to any disclaimer, the term of this patent is extended or adjusted under 35 U.S.C. 154(b) by 102 days.

(21) Appl. No.: 15/151,158

(22) Filed: May 10, 2016

(65) Prior Publication Data

US 2017/0328316 A1    Nov. 16, 2017

(51) Int. Cl.

| | |
|---|---|
| *G05D 11/00* | (2006.01) |
| *F02M 35/10* | (2006.01) |
| *F02B 39/16* | (2006.01) |
| *F02M 35/104* | (2006.01) |
| *F16K 15/02* | (2006.01) |
| *F16K 17/08* | (2006.01) |
| *F16K 27/02* | (2006.01) |
| *F16K 31/122* | (2006.01) |

(52) U.S. Cl.
CPC ....... *F02M 35/10255* (2013.01); *F02B 39/16* (2013.01); *F02M 35/104* (2013.01); *F02M 35/10144* (2013.01); *F02M 35/10157* (2013.01); *F16K 15/026* (2013.01); *F16K 17/08* (2013.01); *F16K 27/0209* (2013.01); *F16K 31/1225* (2013.01); *Y10T 137/2605* (2015.04); *Y10T 137/2642* (2015.04)

(58) Field of Classification Search
CPC ......... Y10T 137/2582; Y10T 137/2605; Y10T 137/2642; Y10T 137/7781; Y10T 137/7787
See application file for complete search history.

(56) References Cited

U.S. PATENT DOCUMENTS

| | | | |
|---|---|---|---|
| 2,895,665 A * | 7/1959 | McSweeney, Sr. ...... | F04B 49/10 137/115.26 |
| 5,492,103 A * | 2/1996 | Goto ................... | F02B 29/0418 123/563 |
| 5,706,852 A * | 1/1998 | Deville ................. | F16K 27/044 137/486 |
| 6,510,867 B2 * | 1/2003 | LaFleur .................. | F16K 17/02 137/242 |
| 6,725,661 B1 * | 4/2004 | Hakansson ............. | F02B 37/16 123/564 |

(Continued)

Primary Examiner — R. K. Arundale
(74) Attorney, Agent, or Firm — Erise IP, P.A.

(57) ABSTRACT

A multi-chamber blowoff valve is provided for releasing excess air pressure from a duct system associated with a vehicle. The blowoff valve has a valve housing, an engine-air interface, and a multiple piston assembly. The valve housing is configured to secure to the duct system at a duct-air interface. The engine-air interface is configured to allow air in and out of the valve housing. The multiple piston assembly is disposed within the valve housing and includes an upper piston and a lower piston that move in unison. The multiple piston assembly is configured to be in a closed position while a pressure differential is above a certain threshold and to be in an open position while the pressure differential is below said certain threshold. While in the open position, a portion of the air in the duct system is released.

19 Claims, 7 Drawing Sheets

(56) References Cited

U.S. PATENT DOCUMENTS

2008/0141921 A1* 6/2008 Hinderks ................ B63B 1/28
              114/274
2011/0220214 A1* 9/2011 Medina ............... F16K 31/1223
              137/12
2015/0369120 A1* 12/2015 Hodebourg ........... F02B 37/183
              123/568.11

* cited by examiner

MULTI-CHAMBER BLOWOFF VALVE

BACKGROUND

1. Field

Embodiments of the invention relate to blowoff valves for releasing excess air pressure. More specifically, embodiments of the invention relate to a multi-chamber blowoff valve configured to be used with a supercharger in a vehicle.

2. Related Art

Superchargers, turbochargers, and the like provide additional air to internal combustion engines. The additional air increases the power and work performed by the internal combustion engine by increasing the amount of fuel that can be burned at a given time. In essence, the supercharger acts as an air compressor to force air into the engine. Often, the air will travel from an outlet of the supercharger to an engine-air interface (typically a throttle) for the engine via a tubing, a piping, a direct connection, or the like.

When the internal combustion engine is spinning rapidly, the supercharger in turn also spins rapidly. This mutual relationship is beneficial because the supercharger is feeding the additional air needed for additional increases in speed and power. However, sudden decreases in speed and power (such as by the driver removing their foot from the accelerator, thus closing the throttle) can be problematic to superchargers of the prior art. Because there is a slight delay in compression of air by the supercharger following a reduction in speed and power, there is often an excessive abundance of air in a duct system of the vehicle when the throttle of the engine is closed.

This abundance of air in the duct system can be problematic for a few reasons. First, the excessive air pressure can cause damage to engine components such as the throttle. Second, the excessive air pressure can cause the air to travel back to the supercharger and damage supercharger components.

Typically, the air pressure in the duct is at a higher pressure than the air in the engine manifold. This can be caused by various restrictions from the air outlet to the engine manifold such as an intercooler, throttle blade, tubing bends and length, etc. If the blowoff valve's ability to contain the air pressure in the ducting is overcome, the valve can be forced open and air will be released from the ducting and not into the engine, reducing power output. Air pressure and vacuum forces acting inside the chamber are what actuates the valve. To keep the blowoff valve shut when duct pressures are higher than manifold pressures, the area of the piston within the blowoff valve must be larger than the sealing surface of the duct, therefore compensating for the greater pressure in the ducting.

Often, the available space within an engine compartment is limited. Therefore, providing a blowoff valve with a minimal volume and cross-sectional area is advantageous to be able to add to existing vehicles. Also, a smaller valve will weigh less, which is desirable in racing applications. Further, larger superchargers require a larger blowoff valve to handle increased airflow and increased pressure differentials created by the increased airflow.

SUMMARY

Embodiments of the invention solve the above-mentioned problems by providing a multi-chamber blowoff valve. The multi-chamber blowoff valve allows for the release of excessive air from a duct system of the vehicle. The multi-chamber blowoff valve presents a smaller volume and cross-sectional area than a standard single-chamber blowoff valve presents. This saves vital space within a vehicle engine compartment. The multi-chamber blowoff valve requires half the pressure/vacuum to actuate the valve (or provides twice the opening/closing force of the valve at the same pressure/vacuum). This ensures the valve will function as intended with minimal forces being applied. Having multiple chambers for the forces of air to act upon increases the surface area on which the manifold pressure has to exert force, resulting in more force available to hold the valve shut when there is a high pressure differential from the ducting to the manifold. The multi-chamber blowoff valve may include two chambers, three chambers, or more chambers.

A first embodiment of the invention is directed to a dual-chamber blowoff valve for releasing excess air pressure from a duct system associated with a vehicle. The blowoff valve of this first embodiment comprises a valve housing, an engine-air interface, and a dual piston assembly. The valve housing is configured to secure or otherwise couple to the duct system at a duct-air interface. The engine-air interface is configured to allow air in and out of the valve housing. The dual piston assembly is disposed within the valve housing and includes an upper piston and a lower piston that move in unison. The dual piston assembly is configured to be in a closed position while a pressure differential is above a certain threshold and to be in an open position while the pressure differential is below said certain threshold. While in the open position, a portion of the air in the duct system is released.

A second embodiment is directed to a dual-chamber blowoff valve that comprises a valve housing, an engine-air interface, a lower chamber, an upper chamber, and a dual piston assembly. The valve housing is configured to secure to the duct system at a duct-air interface. The engine-air interface is configured to allow air in and out of the valve housing. The upper chamber is disposed within the valve housing. The lower chamber is disposed within the valve housing and adjacent to the upper chamber. The dual piston assembly is disposed within the valve housing in both the upper chamber and the lower chamber.

A third embodiment is directed to a multi-chamber blowoff valve for releasing excess air pressure from a duct system associated with a vehicle. The multi-chamber blowoff valve comprises a valve housing and a multiple piston assembly. The valve housing is configured to secure to the duct system at a duct-air interface. The valve housing includes an engine-air interface, at least two chambers, and a duct-air interface. The engine-air interface is configured to allow air in and out of the valve housing. The at least two chambers are disposed within the valve housing and are fluidly connected. The duct-air interface is configured to secure the multi-chamber blowoff valve against the duct system. The multiple piston assembly is disposed within the valve housing. The multiple piston assembly is configured to be in a closed position while a pressure differential is above a certain threshold, and be in an open position while the pressure differential is below said certain threshold, such that a portion of the air in the duct system is released via the duct-air interface.

Additional embodiments may be generally directed to a tri-chamber blowoff valve that comprises a valve housing and a triple piston assembly. Still further embodiments may be generally directed to a quad-chamber blowoff valve that comprises a valve housing and a quadruple piston assembly.

Still other embodiments may be directed to a supercharger system configured to provide compressed air to an internal combustion engine. The supercharger system may comprise a supercharger, a duct system, and a multiple-chamber blowoff valve. Still other embodiments of the invention may be generally directed to a method of assembling a multi-chamber blowoff valve. Further embodiments of the invention may be generally directed to a method of installing a multi-chamber blowoff valve onto a duct system. Yet further embodiments of the invention may be directed to installing a multi-chamber conversion kit into a single chamber blowoff valve so as to create a multi-chamber blowoff valve.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
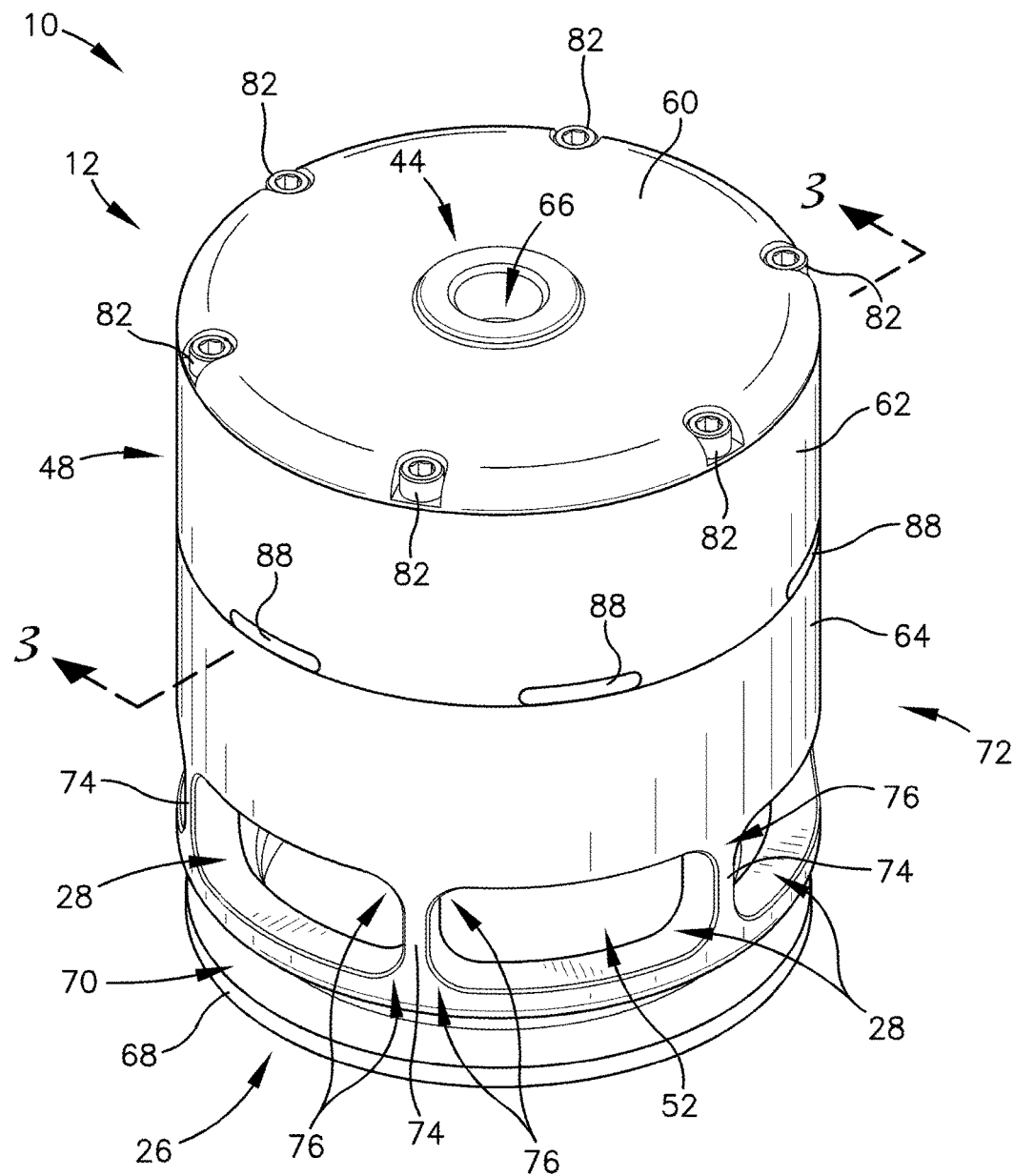
FIG. 1 is a perspective view of a first embodiment of a dual-chamber blowoff valve, as seen from generally above.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 2:
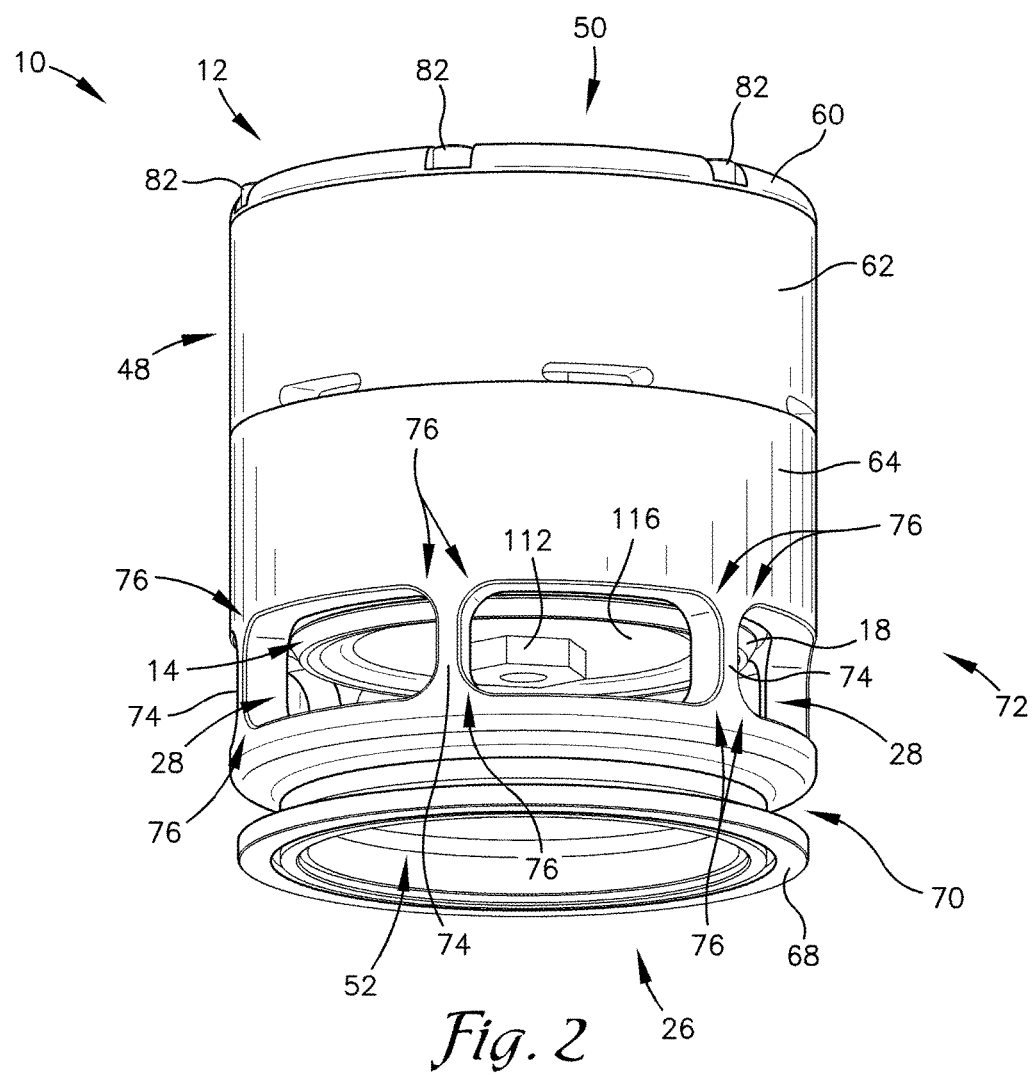
FIG. 2 is a perspective view of the first embodiment of the dual-chamber blowoff valve, as seen from generally below.
Figure 5:
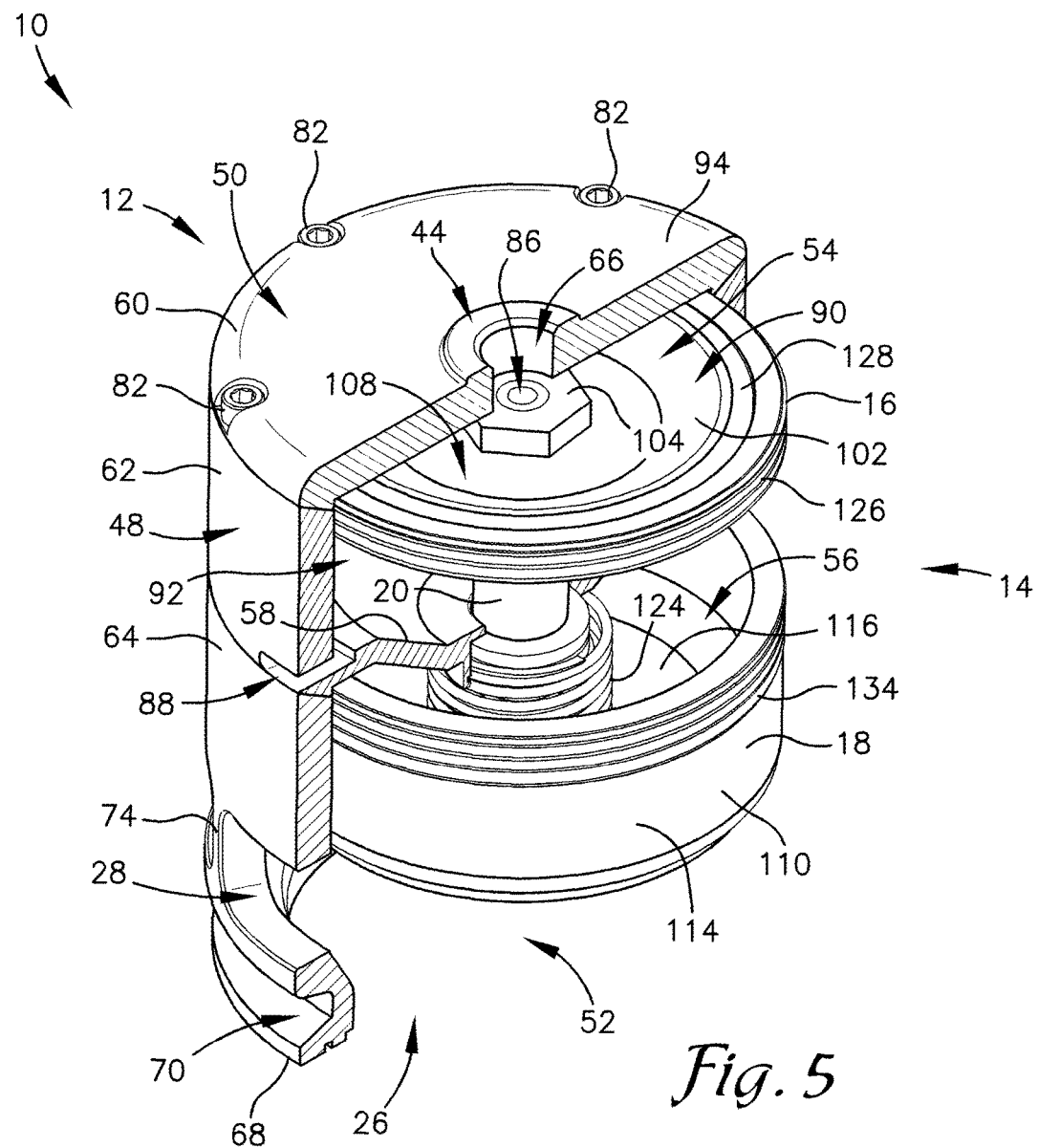
FIG. 5 is a perspective cutaway view of the dual-chamber blowoff valve of FIG. 1, illustrating how an upper piston and a lower piston are disposed within a valve housing.

An exemplary view of a dual-chamber blowoff valve 10 is shown in FIG. 1 and FIG. 2. The dual-chamber blowoff valve 10 broadly comprises a valve housing 12 with a dual piston assembly 14 disposed therein (as best illustrated in FIG. 5). The dual piston assembly 14 is configured to move as a single unit within the valve housing 12 and includes an upper piston 16, a lower piston 18, and a hollow shaft 20. The dual-chamber blowoff valve 10 is configured to be added to an air supply system 22 of an internal combustion engine 24, such as illustrated schematically in FIG. 6.

Figure 3A:
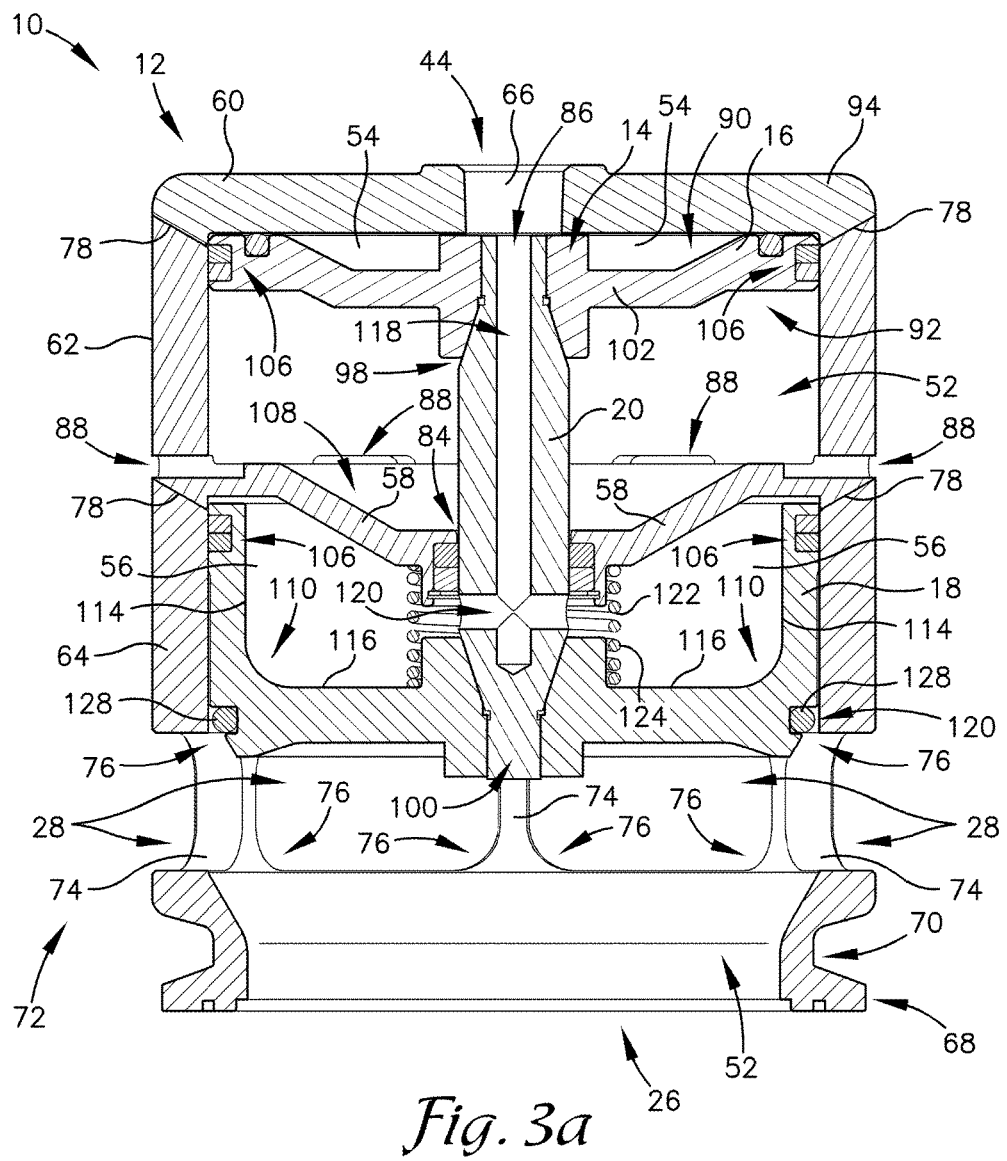
FIG. 3a is a vertical cross-section view through the line 3-3 in FIG. 1, illustrating the interaction of the components of the dual-chamber blowoff valve, illustrated in the open position.
Figure 3B:
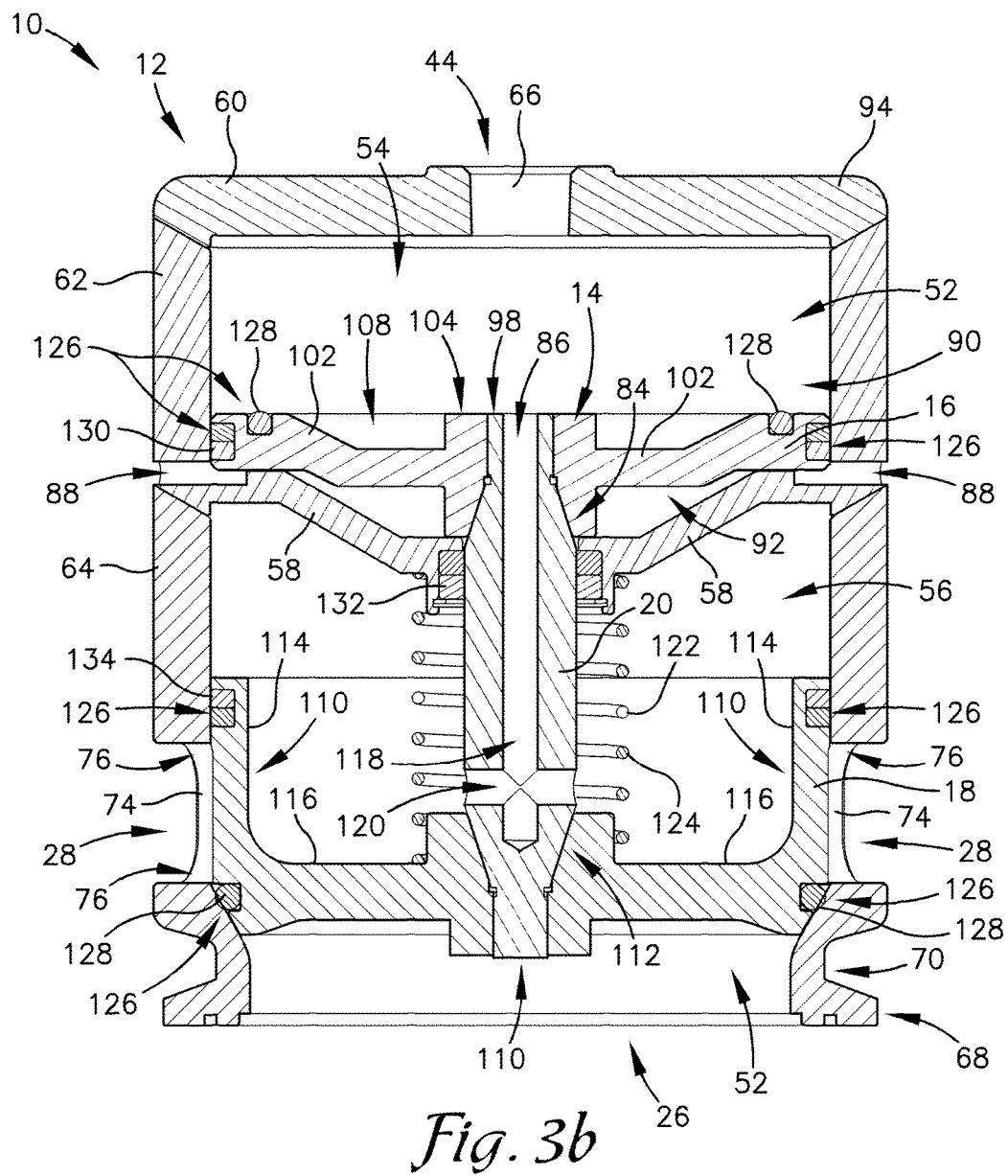
FIG. 3b is a vertical cross-section view of the dual-chamber blowoff valve of FIG. 3a, illustrated in the closed position.
Figure 6:
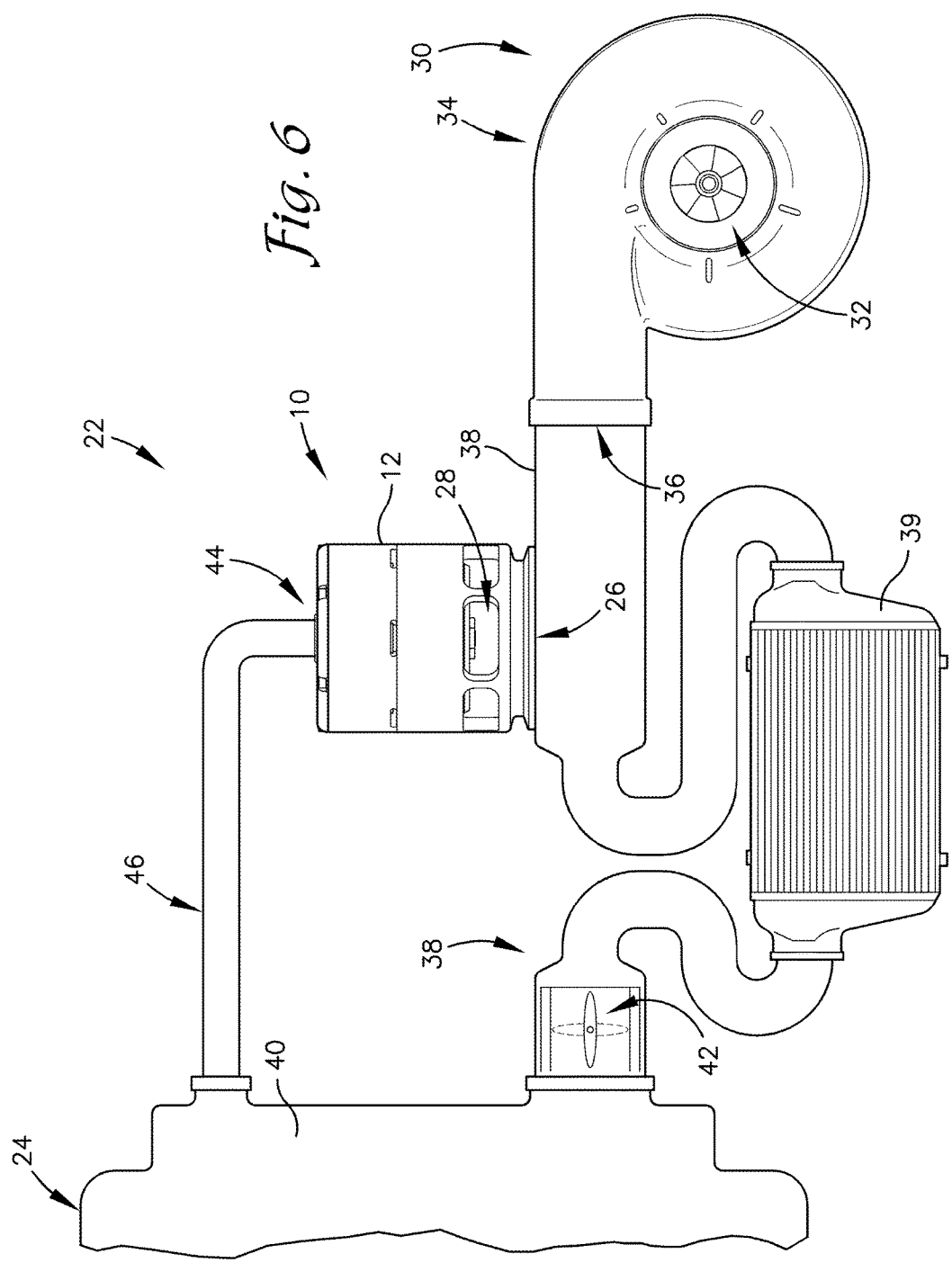
FIG. 6 is a schematic view of the dual-chamber blowoff valve as part of a supercharger system associated with an internal combustion engine.

The dual piston assembly 14 is disposed within the valve housing 12, as best illustrated in FIG. 5. The dual piston assembly 14 is configured to be alternatively placed into an open position and a closed position. While in the open position, the dual piston assembly 14 is generally disposed upward, as illustrated in FIG. 3a. As can be seen in FIG. 3a, air from a duct-air interface 26 will be free to exit through a set of air escape openings 28. While in the closed position, the dual piston assembly 14 is generally disposed downward (relative to the orientation shown in FIG. 1), as illustrated in FIG. 3b. As can be seen, in the closed position the air at the duct-air interface 26 is prevented from exiting the air supply system 22 (as illustrated in FIG. 6) and the air escape openings 28.

It should be appreciated that FIGS. 1-6 illustrate a multi-chamber blowoff valve, which is the dual-chamber blowoff valve 10, and a multiple piston assembly, which is the dual piston assembly 14. The dual-chamber blowoff valve 10 and the dual piston assembly 14 are only an exemplary embodiment of the invention. In another exemplary embodiment, the multi-chamber blowoff valve may be a tri-chamber blowoff valve that includes a triple piston assembly. In yet another exemplary embodiment, the multi-chamber valve may be a quad-chamber blowoff valves that includes a quadruple piston assembly. The tri-chamber blowoff valve and the quad-chamber blowoff valve are not illustrated, but are embodiments of the multi-chamber blowoff valve. These multi-chamber blowoff valves all provide additional surface area with only a minimal increase in volume. It should be appreciated therefore that the description below and the drawings are directed to the dual-chamber blowoff valve 10 for the sake of clarity and simplicity, and that the disclosure is equally applicable to other multi-chamber blowoff valves, such as the tri-chamber blowoff valve and the quad-chamber blowoff valve.

Before discussing the components of the dual-chamber blowoff valve 10 as one embodiment of the multi-chamber blowoff valve, it is helpful to discuss the environment in which embodiments of the invention may be utilized to aid in understanding the structure and function of embodiments of the invention. An exemplary, schematic view of the environment is illustrated in FIG. 6.

A supercharger 30, a turbocharger (not illustrated), or another performance enhancer directs and/or compresses air toward the internal combustion engine 24. The supercharger 30 is typically powered by the internal combustion engine 24. The supercharger 30 therefore has a parasitic affect on the internal combustion engine 24 that is overcome by the excess power that the internal combustion engine 24 can produce based upon the excess air provided by the supercharger 30. For example, a serpentine belt (not illustrated) used to power various components of the vehicle may power an input shaft (not illustrated) of the supercharger 30. The input shaft rotates in response to the rotation of the serpentine belt. The rotating input shaft rotates various gears and belts within the supercharger 30. The supercharger 30 may have a fixed ratio, or a variable ratio. Based upon these ratios, the supercharger 30 spins an impeller 32 that draws air into the supercharger 30 from the external environment. The impeller 32 compresses the air within a compressor housing 34 (sometimes known as a "volute" or "scroll").

As illustrated in FIG. 6, the compressor housing 34 directs the air towards an air outlet 36. The air outlet 36 of the compressor housing 34 is secured to a duct system 38, pipe, or the like (not illustrated). It should be appreciated that the duct system 38 as illustrated in FIG. 6 is straight, but often the duct system 38 will be curved and angled to fit within the allowable engine compartment. The duct system 38 may run through an intercooler 39 to cool the air before it is fed into the internal combustion engine 24. The duct system 38 contains the compressed air that is directed toward an engine manifold 40 or other component of the internal combustion engine 24. While a throttle 42 associated with the internal combustion engine 24 is open (as shown in solid lines in FIG. 6), compressed air from the duct system 38 is pushed into the internal combustion engine 24. When the throttle 42 is closed (as shown in dashed lines in FIG. 6), such as by the driver removing their foot from the accelerator, the compressed air within the duct system 38 needs to be removed. The compressed air is not needed because the throttle 42 being closed means that the excessive power (which the compressed air in the duct system 38 could provide) is not desired by the driver. Further, allowing compressed air to remain within the duct system 38 can be problematic, as discussed above.

Embodiments of the invention therefore utilize the dual-chamber blowoff valve 10 to release the compressed air from the duct system 38. In some embodiments of the invention, the compressed air is released into the atmosphere, such that the air is no longer in the system. In other embodiments, the compressed air is released back into an inlet of a turbocharger, such that the air can be utilized again.

As briefly discussed above, the dual-chamber blowoff valve 10 is configured to be selectively positioned in a closed position and an open position. In the closed position, the compressed air is retained within the duct system 38. In the open position, the compressed air is released from the duct system 38. The dual-chamber blowoff valve 10 opens and closes without direct operator input based upon the conditions within the internal combustion engine 24. The air needs and air supply within the internal combustion engine 24 dictate whether the dual-chamber blowoff valve 10 is in the open or the closed position.

The dual-chamber blowoff valve 10 is selectively moved between the open position to the closed position based upon a pressure differential acting on the dual piston assembly 14. An engine-air interface 44 into the dual-chamber blowoff valve 10 is fluidly connected to the internal combustion engine 24, such as at the engine manifold 40. The engine-air interface 44 is connected to the engine manifold 40 independent of the throttle 42. The throttle 42 opens and closes to selectively allow air to enter into the internal combustion engine 24 (based upon the desired performance by the operator, such as by operating the accelerator of the vehicle). The engine-air interface 44 is secured by a hose 46, a line, or a duct directly from the engine manifold 40. The air therefore flows toward and away from the dual-chamber blowoff valve 10 regardless of whether the throttle 42 is open. This allows the engine-air interface 44 to indicate conditions within the internal combustion engine 24.

The engine air exerts either a positive or a negative pressure on the dual piston assembly 14 within the valve housing 12. The pressure exerted on the dual piston assembly 14 opposes pressure exerted on the dual piston assembly 14 from the duct air and/or the external atmospheric air. These opposing pressures form a pressure differential. The pressure differential forces the dual piston assembly 14 between the closed position and the open position.

It should be appreciated that the present disclosure refers to different "airs" (e.g., engine air vs. duct air) based upon the location of the air. The pressure of the air may differ greatly by location, and as such aids in the movement of the dual piston assembly 14. "Engine air" or "internal air" is the air that is already within the engine manifold 40 and that may travel through the hose 46 to the engine-air interface 44 and exert the pressure on the dual piston assembly 14. "Duct air" or "compressed air" is air that is within the duct system 38 that has traveled from the supercharger 30 toward the engine manifold 40. It should be appreciated that while the throttle 42 is open (as shown in solid lines in FIG. 6), the duct air is freely mixing with the engine air because the duct air is being forced into the engine manifold 40. "External air" or "atmospheric air" is air that is external to the dual-chamber blowoff valve 10, the engine manifold 40, and the duct system 38. Typically, external air is at or near a standard atmospheric pressure for the given altitude. Similarly, air escaping the dual-chamber blowoff valve 10 in the open position will typically escape to atmosphere and thus be atmospheric air.

Similarly, it should be appreciated that the pressure differential is used to describe the forces being imparted on the dual piston assembly 14 by the various "airs" discussed above. The pressure differential is described as positive when the engine air exerts a greater positive pressure than the duct air. The positive pressure differential presses generally downward on the dual piston assembly 14 (relative to the exemplary orientation as illustrated in FIG. 1). Conversely, the pressure differential is described as negative when the engine air exerts less pressure than the duct air. The negative pressure differential generally presses upward, toward the open position.

It should be noted that typically, the negative pressure differential is created (at least in part) by forming a vacuum within the engine manifold 40 in response to the throttle 42 closing. The throttle 42 closing is indicative that no additional air is required in the internal combustion engine 24. As such, the vacuum in the engine manifold 40 drops the air pressure of the engine air and creates a negative pressure differential. As discussed above, the negative pressure differential moves the dual-chamber blowoff valve 10 to the open position such that the excess duct air can be released, because the vacuum in the engine manifold 40 is indicative that the compressed duct air is not currently needed by the internal combustion engine 24.

The various components of the dual-chamber blowoff valve 10 will now be discussed in more detail. As best illustrated in FIGS. 1 and 2, the dual-chamber blowoff valve 10 includes a valve housing 12. As best illustrated in FIGS. 3a, 3b, and 5, the dual-chamber blowoff valve 10 includes a dual piston assembly 14. Typically, the valve housing 12 is a static component to be attached to the duct system 38. The dual piston assembly 14 is nested within the valve housing 12 such that the dual piston assembly 14 can actively move between the open position and the closed position without fully leaving the valve housing 12.

In embodiments of the invention, the valve housing 12 presents a general cylinder shape, comprising a rounded sidewall 48 and a top 50. The general cylinder shape is open on the bottom side at the duct-air interface 26. The valve housing 12 therefore presents a void 52 into which the dual piston assembly 14 is placed. The cylinder shape is advantageous because the pressure from engine 24 and the duct air is evenly distributed onto the dual piston assembly 14. Lateral air pressure in the valve housing 12 is equalized based upon the rounded cylindrical shape. It should be appreciated that typically the dual piston assembly 14 presents a generally complementary shape to an interior shape of the valve housing 12. This is because the rounded sidewall 48 and the top 50 of the cylinder shape (in addition to a central plate 58, discussed below) create an upper chamber 54 and a lower chamber 56 (separated by a central plate 58, as discussed below and illustrated in FIG. 5) through which the dual piston assembly 14 can move. In other embodiments, the valve housing 12 presents another general shape, such as an elliptical cylinder, an ovoid cylinder, a rectangular prism, a hexagon prism, an octagonal prism, or similar prismatic shape.

The size and shape chosen for the valve housing 12 may be based upon structural stability and/or the size and shape of the area into which the dual-chamber blowoff valve 10 is configured to be emplaced. For example, the allowable space within an engine compartment of a given vehicle may be mostly occupied by the supercharger 30, the duct system 38, the intercooler 39, and other components that may have been added by the operator "after market." In these vehicles, the available space for the dual-chamber blowoff valve 10 may be small and of a specific shape. The upper chamber 54 and the lower chamber 56 of the dual-chamber blowoff valve 10 allow the dual-chamber blowoff valve 10 to present a smaller volume and cross-sectional area than a comparable single chamber blowoff valve would present. This is because in order to create the same pressure differential, a single large piston would have to be roughly twice as large in cross-sectional area and thicker to withstand the pressures that would be placed on the piston toward the edges.

In embodiments of the invention, the valve housing 12 generally comprises a housing upper-body 60, a housing mid-body 62, and a housing lower-body 64. In embodiments of the invention, the valve housing 12 presents the engine-air interface 44, the duct-air interface 26, and at least one air escape opening 28. In embodiments, the engine-air interface 44 is disposed in the housing upper-body 60, and the duct-air interface 26 and the at least one air escape opening 28 is disposed on the housing lower-body 64. The central plate 58, which divides the void 52 of the valve housing 12 into the upper chamber 54 and the lower chamber 56, is disposed on the housing mid-body 62 in embodiments of the invention. These embodiments of the valve housing 12 are divided into the various components 60, 62, 64 to aid in the assembly of the dual-chamber blowoff valve 10. In essence, as described below, the valve housing 12 is formed around the dual piston assembly 14 so as to trap the dual piston assembly 14 within the valve housing 12 and to form the upper chamber 54 and the lower chamber 56 each of which interacts with the dual piston assembly 14. In other embodiments, all or a portion of the described components may be unitary, monolithic, or configured in various complementary shapes.

The engine-air interface 44 is configured to allow air in and out of the valve housing 12. The engine-air interface 44 may include a top opening 66, a recess, a void, a threaded member, a protrusion, a hollow cylinder, and/or another type of interface that is configured to receive the hose 46 from the engine manifold 40. In embodiments of the invention, such as illustrated in FIG. 1, the engine-air interface 44 is disposed at or near a central point of the housing upper-body 60. This allows the air traveling to and from the engine manifold 40 to enter the upper chamber 54 and the lower chamber 56 (as discussed below). In other embodiments, the engine-air interface 44 may be offset away from the central point of the housing upper-body 60.

The duct-air interface 26 is configured to secure to the duct system 38 such that air flowing in the duct system 38 flows substantially past the dual-chamber blowoff valve 10. The duct-air interface 26 may include an annular protrusion 68 and an annular recess 70. The annular protrusion 68 and the annular recess 70 are configured to interface with the duct system 38 such that the duct-air interface 26 can be secured to the duct system 38 in a substantially airtight manner. It should be noted that the dual-chamber design allows for a greater surface area of the dual piston assembly 14 while retaining standard-sized duct-air interfaces. As such, the operator may be able to install the dual-chamber blowoff valve 10 in the place of a standard blowoff valve to increase the surface area without having to install a new interface on the duct system 38. This saves space as well as money and effort by the operator.

The duct-air interface 26 is open for interfacing with the duct air within the duct system 38. The duct air presses against the dual piston assembly 14 through the duct-air interface 26 while the dual piston assembly 14 is in the closed position. The duct air pressing against the dual piston assembly 14 (and specifically the lower piston 18) moves into the void 52 (and thus into the valve housing 12) and out through the air escape openings 28 while the dual piston assembly 14 is in the open position.

In embodiments of the invention, the air escape openings 28 are disposed along a bottom end 72 of the housing lower-body 64. The air escape openings 28 allow air within the valve housing 12, below the lower piston 18, to escape. Typically, the dual piston assembly 14 will be in the open position while the duct air is under high pressure. For example, as discussed above, if the vehicle operator is rapidly accelerating, the supercharger 30 will move a large amount of air into the duct system 38 to sustain the rapid energy production of the internal combustion engine 24. If the operator then removes their foot from the accelerator, the throttle 42 of the internal combustion engine 24 will close and not allow the duct air to enter the internal combustion engine 24. The high pressure duct air will then overcome the pressure differential against the low pressure and/or vacuum engine air to push the dual piston assembly 14 into the open position. This allows the duct air to escape from the duct system 38 via the air escape openings 28.

In embodiments of the invention, the air escape openings 28 are disposed around the sidewall 48 of the housing lower-body 64, such that the duct air can escape in many directions. As can be seen in FIGS. 1 and 2, in embodiments of the invention, the air escape openings 28 are substantially rectangular, so as to present a set of support posts 74 therebetween. The support posts 74 provide structural stability to the housing lower-body 64 while allowing a maximum amount of air to escape. The support posts 74 may include arcuate corners 76 for additional structural stability.

The air escape openings 28 present a height that is the same as or slightly smaller than a height of the lower piston 18. As can be seen in FIG. 3b, when the dual piston assembly 14 is in the closed position, the lower piston 18 substantially covers the air escape openings 28 such that no (or substantially no) duct air can escape. As can be seen in FIG. 3a, when the dual piston assembly 14 is in the fully open position, the lower piston 18 has substantially cleared the air escape openings 28 such that air from the duct system 38 can be fully expelled.

The housing lower-body 64 is a general open cylinder shape. The housing lower-body 64 includes the duct-air interface 26 and the air escape openings 28, as discussed above. The housing lower-body 64 may further include a beveled top edge 78, a plurality of fastener receptors 80, the annular protrusion 68, and the annular recess 70. In embodiments of the invention, the dual-chamber blowoff valve 10 is assembled by starting with the housing lower-body 64 and inserting and securing components therein until completion.

Figure 4:
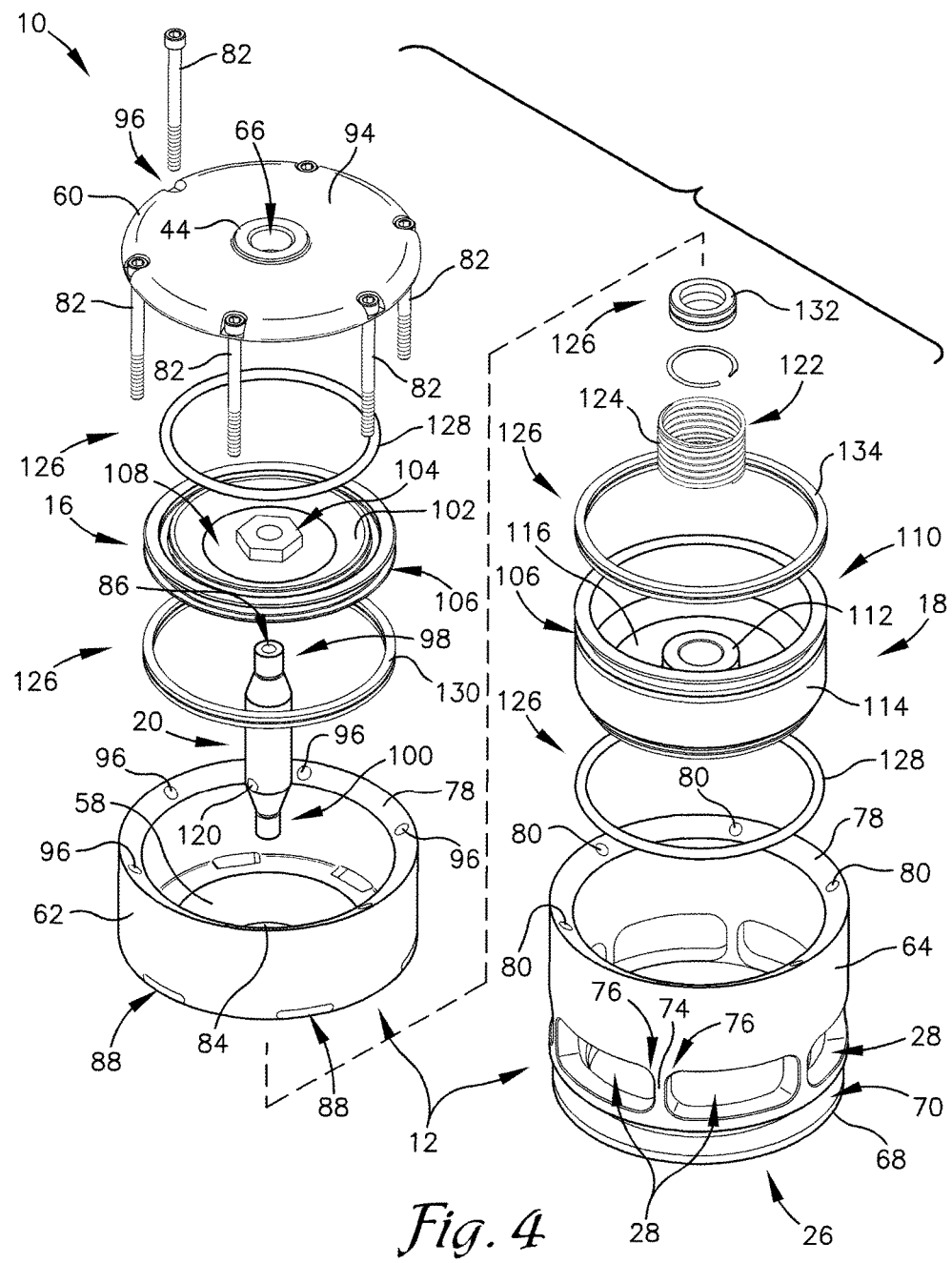
FIG. 4 is an exploded view of the dual-chamber blowoff valve, illustrating the various components.

The beveled top edge 78 is configured to receive the housing mid-body 62 so as to maintain the housing mid-body 62 centered and aligned with the housing lower-body 64. In embodiments of the invention, the beveled edge is lower toward the void 52 of the valve housing 12 (as best illustrated in FIGS. 3 and 4). It should also be appreciated that the housing mid-body 62 (as discussed below) may also present the beveled top edge 78 that is substantially similar to the beveled top edge 78 of the housing lower-body 64.

Each fastener receptor 80 is configured to receive a fastener 82 therein. In embodiments of the invention, such as illustrated in FIG. 4, the fastener 82 is configured to pass through the housing upper-body 60 and the housing mid-body 62 before being secured within the fastener receptors 80 of the housing lower-body 64. In this way, as the dual-chamber blowoff valve 10 is being assembled, a single set of fasteners 82 can hold the valve together. This aids in assembly, disassembly, and uninstallation if necessary.

The housing mid-body 62 is secured atop the housing lower-body 64. The housing mid-body 62 includes the central plate 58. The central plate 58 divides the void 52 of the valve housing 12 into an upper chamber 54 and a lower chamber 56. The central plate 58 is generally disk-shaped and presents a shaft opening 84. The shaft opening 84 is configured to receive the hollow shaft 20 therein and to move up and down relative to the central plate 58. The upper chamber 54 allows the upper piston 16 to move up and down therein, while the lower piston 18 simultaneously moves up and down in the lower chamber 56. The dual chambers are fluidly connected via an inner void 86 of the hollow shaft 20 that connects the upper piston 16 to the lower piston 18, as discussed below. The central plate 58 therefore provides a division between the two chambers, such that the engine air within the lower chamber 56 presses against a solid, stable surface.

In embodiments of the invention, the housing mid-body 62 includes at least one passive-side opening 88. The passive-side openings 88 allow for air to enter and escape the upper chamber 54 below the upper piston 16. The upper chamber 54 can be described as including a working side 90 and a passive side 92. The working side 90 is above the upper piston 16 and includes the area in which the engine air is exerting pressures on the upper piston 16. The passive side 92 is below the upper piston 16. If the passive side 92 were fully enclosed, the passive side 92 would exert an upward pressure on the upper piston 16 while the dual piston assembly 14 is in or near the closed position as the upper piston 16 compresses the air within the passive side 92. As such, in embodiments of the invention, the housing mid-body 62 includes the passive-side openings 88 to allow atmospheric air in and out of the upper chamber 54 while the upper piston 16 moves up and down therein. This prevents undesired pressures from acting upon the upper piston 16. As can be seen in FIG. 1, the passive-side openings 88 are typically much smaller in surface area than the air escape openings 28. This is because the air escape openings 28 are configured to rapidly dispel a large amount of air, which is not required of the passive-side openings 88.

The housing upper-body 60 is configured to be secured atop the housing mid-body 62. The housing upper-body 60 generally includes the engine-air interface 44 and an upper plate 94. The upper plate 94 forms a portion of the upper chamber 54, located on the working side 90 of the upper piston 16. The upper plate 94 also seals the dual piston assembly 14 within the void 52 of the valve housing 12.

The housing upper-body 60 and the housing mid-body 62 may each present fastener openings 96 that are configured to align with the fastener receptors 80 of the housing lower-body 64. The fastener openings 96 align so as to allow the fastener to pass through the housing upper-body 60, through the housing mid-body 62, and secure to the housing lower-body 64. As illustrated in FIG. 1, the exemplary embodiment of the invention has six fasteners 82 each disposed in their respective fastener openings 96.

The dual piston assembly 14 will now be discussed in greater detail. The dual piston assembly 14 comprises the upper piston 16, the lower piston 18, and the hollow shaft 20. The upper piston 16 and the lower piston 18 move in unison upward and downward within the valve housing 12. The upper piston 16 and the lower piston 18 are kept in unison by the hollow shaft 20 that is disposed between them. An upper end 98 of the hollow shaft 20 is secured to the upper piston 16, and a lower end 100 of the hollow shaft 20 is secured to the lower piston 18. The unison movement combined with the fluid connection between the dual chambers effectively doubles the surface area of a single piston.

In embodiments of the invention, the upper piston 16 broadly comprises a disk 102, an upper shaft interface 104, and at least one sealant receptor 106. The disk 102 is generally flat, and may present a generally circular depressed region 108 centered in the upper piston 16. The depressed region 108 orients the force applied by the engine air in a generally downward direction and prevents torques from being applied against the upper piston 16.

In embodiments of the invention, the lower piston 18 broadly comprises a cup 110, a lower shaft interface 112, and at least one sealant receptor 106. The cup 110 is generally cylindrical with an open top. The cup 110 includes a circular wall 114 and a floor 116. The cup 110, in combination with a lower side of the central plate 58, forms the lower chamber 56. When the dual piston assembly 14 is in the closed position (or in an intermediate position), at least a portion of the circular wall 114 of the housing lower-body 64 further forms the lower chamber 56.

The circular wall 114 presents an outer diameter that is the same as or slightly smaller than an inner diameter of the valve housing 12. The outer diameter of the circular wall 114 of the lower piston 18 is also substantially similar to an outer diameter of the disk 102 of the upper piston 16. In embodiments of the invention, the respective outer diameters are substantially similar also to maximize the surface area of the dual piston assembly 14. In other embodiments, the upper piston 16 and the lower piston 18 may present respective outer diameters that are not substantially identical. For example, if a lower surface area is desired, an operator may place a spacer within the upper chamber 54 with a small diameter along with an upper piston 16 of the same (or substantially the same) small diameter.

In embodiments of the invention, the hollow shaft 20 presents the inner void 86. The hollow shaft 20 is configured to be secured to the upper piston 16 and secured to the lower piston 18. The hollow shaft 20 therefore ensures both that the upper piston 16 and the lower piston 18 move in unison and also fluidly connects the upper piston 16 to the lower piston 18. The fluid connection means that the upper piston 16 and the lower piston 18 in essence work as a single larger piston. This allows for the greater piston size to fit into a smaller area, which is advantageous for vehicular modification applications in which the dual-chamber blowoff valve 10, the supercharger 30, and at least a portion of the duct system 38 may be added to an already existing vehicle.

In embodiments of the invention, the inner void 86 of the hollow shaft 20 comprises a vertical segment 118 and a horizontal segment 120. The vertical segment 118 is open at the top to allow air to flow in and out of the hollow shaft 20. A portion of the air entering the upper chamber 54 from the engine-air interface 44 will enter the vertical segment 118, as the vertical segment 118 is open at the top end of the hollow shaft 20. The horizontal segment 120 allows air to from the vertical segment 118 in and out of the lower chamber 56. The horizontal segment 120 therefore redirects the air in the vertical segment 118 into the lower chamber 56. Both the vertical segment 118 and the horizontal segment 120 are relatively small in area as the hollow shaft 20 is used to fluidly connect the upper chamber 54 and the lower chamber 56, and not to receive and transfer substantial forces due to the pressure of the engine air therein.

In embodiments of the invention, the top end of the hollow shaft 20 is tapered and the lower end 100 of the hollow shaft 20 is tapered. The tapered shape of the upper end 98 and the lower end 100 allows for the upper piston 16 and the lower piston 18 to be fully concentric. Further, the tapered ends securely seat the respective upper piston 16 and lower piston 18 in the correct position relative to the hollow shaft 20.

In embodiments of the invention, the dual-chamber blowoff valve 10 further includes an actuator 122 disposed within the valve housing 12 to apply a force to the dual piston assembly 14 toward the closed position. Typically, as illustrated in FIGS. 3a and 3b, the actuator 122 is a spring 124 disposed within the lower chamber 56. More specifically, the spring 124 is disposed around the hollow shaft 20, between the central plate 58 and the lower piston 18. The spring 124 is disposed around the hollow shaft 20 to keep the spring 124 aligned vertically. The spring 124 provides a downward force that presses the lower piston 18 downward. As such, it should be appreciated that the pressure differentials discussed herein may include forces imparted on the dual piston assembly 14 by the spring 124 or another actuator 122. In some embodiments, the spring 124 or a second spring (not illustrated) is disposed in the upper chamber 54.

In embodiments of the invention, the force exerted by the spring 124 is for the purpose of keeping the dual piston assembly 14 in the closed position while the internal combustion engine 24 is off. Absent the spring 124, when the internal combustion engine 24 is off the dual piston assembly 14 may be in the open position. While in the open position, and without duct air rapidly blowing out of the air escape openings 28, debris may enter the air escape openings 28 and the duct system 38. The spring 124 therefore acts to keep the dual piston assembly 14 in the closed position while the internal combustion engine 24 is off and in other instances when the respective pressures are substantially equal. It is typically desirable that the dual piston assembly 14 only be in the open position while the negative pressure differential is indicative that the compressed air in the duct system 38 needs to be ejected from the duct system 38.

In embodiments of the invention, the dual piston assembly 14 includes a set of sealing rings 126, as best illustrated in FIG. 4. In some embodiments, the set of sealing rings 126 comprises a dampening ring 128, an upper piston sealing ring 130, a shaft sealing ring 132, and a lower piston sealing ring 134. Typically, the sealing rings 126 are utilized between a static component (such as a portion of the valve housing 12) and a dynamic component (such as a portion of the dual piston assembly 14).

The set of sealing rings 126 are installed around the various components, such as at the sealant receptors 106 as best illustrated in FIGS. 3a and 3b, to perform certain functions. One exemplary function is sealing the two adjacent components to prevent air from leaking between the components. Another exemplary function is lubricating and assisting in the sliding of the dynamic component relative to the static component. Yet another exemplary function is preventing damage from being imparted on the components by absorbing forces and shocks.

The dampening ring 128 is configured to be installed onto the upper piston 16 and/or the housing upper body. The dampening ring 128 prevents damage to the various components caused by the dual piston assembly 14 rapidly transferring to the open position. Such rapid transitions are common due to the rapid and great air pressure swings that are common in supercharger systems. Other dampening rings 128 may be present to prevent damage such as between the lower piston 18 and the central plate 58, between the upper piston 16 and the lower plate, and between the lower piston 18 and the duct-air interface 26.

The upper piston sealing ring 130 is disposed around the upper piston 16, and the lower piston sealing ring 134 is disposed around the lower piston 18. In some embodiments of the invention, the respective piston sealing rings 130, 134 each comprise a slide assist and a sealant, each being distinct rings. The slide assist and the sealant are disposed adjacent to one another. In some embodiments, two identical rings are utilized adjacent to one another for redundancy and increased sealing.

In embodiments of the invention, the shaft sealing ring 132 is disposed on the central plate 58 of the housing mid-body 62. The shaft sealing ring 132 is configured to allow the hollow shaft 20 to move up and down relative to the central plate 58 so as move the dual piston assembly 14 between the open and closed positions.

The set of sealing rings 126 may be rubber o-rings or formed of a polymer material to facilitate the relative motion of the metallic components of the dual-chamber blowoff valve 10. For example, the set of sealing rings 126 may be formed of a polyethylene, such as an ultra-high molecular weight polyethylene, Teflon, or other similar substances.

In embodiments of the invention, the valve housing 12 is held together via fasteners 82 inserted into the above discussed fastener openings 96 and fastener receptors 80. In embodiments, such as illustrated in FIG. 4, the fasteners 82 pass through the housing upper-body 60, through the housing mid-body 62, and into the housing lower-body 64. In these embodiments, the fasteners 82 are inserted substantially downward. In other embodiments, the fasteners 82 are inserted from below and inserted substantially upward. In still other embodiments, the valve housing 12 may be secured by another method, such as by welding, soldering, the application of a chemical adhesive, by a mechanical locking mechanism, or the like.

In other embodiments of the invention, the valve housing 12 comprises a housing upper-body 60 and a housing lower-body 64, without a housing mid-body 62. In these embodiments, the central plate 58 may be secured to the housing lower-body 64. The dual piston assembly 14 is assembled around the central plate 58, and the housing upper-body 60 is secured to the housing lower-body 64.

In embodiments of the invention, the dual-chamber blowoff valve 10 comprises a single-chamber blowoff valve and a dual-chamber conversion kit (not illustrated). The dual-chamber conversion kit is configured to convert the standard single-chamber blowoff valve into a dual-chamber blowoff valve 10. This will increase the surface area of the piston so as to alter the pressure differential. For example if the operator has a small supercharger 30 and a standard single-chamber blowoff valve in their vehicle, and decides to upgrade to a larger supercharger 30, the dual-chamber conversion kit will allow the operator to increase the surface area of the piston by converting the single-chamber blowoff valve into a dual-chamber blowoff valve 10.

In some embodiments, the operator may desire to change the entire single-chamber blowoff valve to the dual-chamber blowoff valve 10. In these instances, the dual-chamber blowoff valve 10 of embodiments of the invention allows the operator to install the dual-chamber blowoff valve 10 in place of the single-chamber blowoff valve without needing to replace any components of the duct system 38. The dual-chamber blowoff valve 10 is structurally similar at the duct-air interface 26 and the engine-air interface 44 to allow for easy upgrading.

It should be appreciated that the dual-chamber blowoff valve 10 has been discussed herein with regard to use with a supercharger 30. It should be appreciated that other embodiments of the invention may utilize the dual-chamber blowoff may be utilized to emit fluids that are under excess pressure in other fields. For example, these fields could be turbochargers, hydraulics, pneumatics, and other fields that include high pressure fluids that may need to be evacuated.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A dual-chamber blowoff valve for releasing air pressure from a duct system associated with a vehicle, the dual-chamber blowoff valve comprising:
    a valve housing configured to secure to the duct system;
    an engine-air interface configured to allow air in and out of the valve housing; and
    a dual piston assembly disposed within the valve housing including an upper piston and a lower piston that move in unison,
    wherein the dual piston assembly is configured to be in a closed position while a pressure differential is above a threshold,
    wherein the dual piston assembly is configured to be in an open position while the pressure differential is below said threshold, such that a portion of the air in the duct system is released,
    wherein the dual piston assembly presents a hollow shaft secured to the upper piston and secured to the lower piston,
    wherein the hollow shaft includes an inner void to direct air from the engine-air interface to the lower piston.

2. The dual-chamber blowoff valve of claim 1, wherein said duct system is configured to direct air from a supercharger to an engine manifold of an internal combustion engine.

3. The dual-chamber blowoff valve of claim 1, wherein the valve housing includes a duct-air interface configured to secure to the duct system such that air flowing in the duct system flows substantially past the dual-chamber blowoff valve while the dual piston assembly is in the closed position.

4. The dual-chamber blowoff valve of claim 1, wherein the dual-chamber blowoff valve further includes an actuator disposed within the valve housing to apply a force to the dual piston assembly toward the closed position.

5. The dual-chamber blowoff valve of claim 1, wherein the valve housing includes an air escape opening that allows air within the duct system to flow past the lower piston out of the dual-chamber blowoff valve.

6. The dual-chamber blowoff valve of claim 1, wherein the hollow shaft includes a tapered top end and a tapered lower end.

7. The dual-chamber blowoff valve of claim 1, wherein the valve housing further comprises:
    a housing lower-body that includes the duct-air interface;
    a housing mid-body secured atop the housing lower-body; and
    a housing upper-body secured atop the housing mid-body,
    wherein the housing upper-body includes the engine-air interface,
    wherein the upper piston is disposed substantially within the housing mid-body,
    wherein the lower piston is disposed substantially within the housing lower-body.

8. The dual-chamber blowoff valve of claim 7,
    wherein the housing mid-body includes a central plate,
    wherein a bottom side of the central plate and the lower piston present a lower chamber,
    wherein a bottom side of the housing upper-body and the upper piston present an upper chamber.

9. The dual-chamber blowoff valve of claim 8,
    wherein an upper side of the central plate contacts the upper piston while the dual piston assembly is in the closed position,
    wherein the duct interface contacts the lower piston while the dual piston assembly is in the closed position,
    wherein a bottom side of the housing upper-body contacts the upper piston while the dual piston assembly is in the open position.

10. The dual-chamber blowoff valve of claim 7, further comprising:
    a fastener for securing the housing lower-body to the housing mid-body and the housing upper-body,
    wherein the housing mid-body and the housing upper-body each present a fastener opening,
    wherein the housing lower-body presents a fastener receptor,
    wherein the fastener is configured to pass through the fastener opening of the housing upper-body, through the fastener opening of the housing mid-body, and secured to the fastener receptor of the housing lower-body.

11. A dual-chamber blowoff valve for releasing air pressure from a duct system associated with a vehicle, the dual-chamber blowoff valve comprising:
    a valve housing configured to secure to the duct system at a duct-air interface;

an engine-air interface configured to allow air in and out of the valve housing;

an upper chamber disposed within the valve housing;

a lower chamber fluidly disposed within the valve housing and adjacent to the upper chamber;

a hollow shaft that allows air to travel from the upper chamber to the lower chamber; and a dual piston assembly disposed within the valve housing in both the upper chamber and the lower chamber, wherein the dual piston assembly is configured to be in a closed position while a pressure differential is above a threshold, wherein the dual piston assembly is configured to be in an open position while the pressure differential is below said threshold, such that a portion of the air in the duct system is released.

12. The dual-chamber blowoff valve of claim 11, wherein said duct system is configured to direct air from a supercharger to an engine manifold of an internal combustion engine of the vehicle.

13. The dual-chamber blowoff valve of claim 11, wherein the dual piston assembly comprises:

an upper piston;

a lower piston; and wherein the hollow shaft is disposed between the upper piston and the lower piston.

14. The dual-chamber blowoff valve of claim 13, wherein the valve housing comprises a central plate disposed between the upper chamber and the lower chamber, wherein at least a portion of the hollow shaft is disposed through a shaft opening of the central plate.

15. The dual-chamber blowoff valve of claim 11, wherein the valve housing further comprises an air escape opening that allow air from the duct system to exit through the air escape opening.

16. The dual-chamber blowoff valve of claim 15, wherein the air escape opening of the valve housing presents a height, wherein a lower piston presents a height that is greater that the height presented by the air escape opening, wherein while the dual piston assembly is in the closed position, the lower piston is substantially covering the air escape opening.

17. The dual-chamber blowoff valve of claim 11, further comprising:

a spring disposed within the lower chamber for providing a force in a downward direction, wherein said force keeps the dual piston assembly in the closed position while the internal combustion engine is not operating.

18. A multi-chamber blowoff valve for releasing air pressure from a duct system associated with a vehicle, the multi-chamber blowoff valve comprising:

a valve housing configured to secure to the duct system;

said valve housing including— an engine-air interface configured to allow air in and out of the valve housing;

at least two chambers disposed within the valve housing, wherein said at least two chambers are fluidly connected via a hollow shaft;

a duct-air interface configured to secure the multi-chamber blowoff valve against the duct system; and a multiple piston assembly disposed within the valve housing;

wherein the multiple piston assembly is configured to be in a closed position while a pressure differential is above a threshold, wherein the multiple piston assembly is configured to be in an open position while the pressure differential is below said threshold, such that a portion of the air in the duct system is released via the duct-air interface.

19. The dual-chamber blowoff valve of claim 18, wherein at least one chamber of said at least two chambers presents a passive-side opening to allow air on a passive side of said at least one chamber to enter and exit said at least one chamber opposite the multiple piston assembly disposed therein, wherein one chamber of said at least two chambers presents an air escape opening to allow air to escape from the duct-air interface to below the multiple piston assembly that is in the open position, wherein each of said at least two chambers is separated by a central plate, wherein each central plate presents a shaft opening to allow said hollow shaft of the multiple piston assembly to pass there through.

* * * * *